Figure 1:
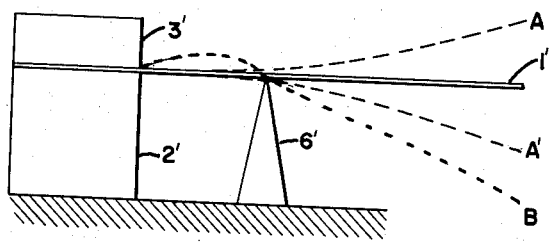

June 18, 1963

A. P. WEINER 3,094,098

VIBRATING REED REMOTE CONTROL TRANSMITTER

Filed Sept. 11, 1961

INVENTOR:
ALBERT P. WEINER,
BY *Joseph Levinson*
HIS ATTORNEY.

Patented June 18, 1963

3,094,098
VIBRATING REED REMOTE CONTROL
TRANSMITTER
Albert P. Weiner, North Syracuse, N.Y., assignor to General Electric Company, a corporation of New York
Filed Sept. 11, 1961, Ser. No. 137,252
7 Claims. (Cl. 116—137)

This invention relates to a remote control transmitter, and more particularly to a vibrating reed remote control transmitter which generates a modulated ultrasonic signal by means of a vibrating reed.

In an application entitled "Vibrating Reed Remote Control Transmitter," Serial No. 137,241 which is assigned to the assignee of the present invention, a vibrating reed remote control transmitter is provided which generates a modulated ultrasonic signal by means of a vibrating reed. The generated signal is obtained by impacting a vibrating reed during at least a portion of a cycle of vibration of the reed to excite higher mode frequencies in the reed. The higher modes are overtones which are governed to a ceratin extend by the method used in exciting the reed for vibration.

Accordingly, it is an object of this invention to provide a novel actuator means for a vibrating reed transmitter.

The vibrating reed transmitter of the aforesaid application also generates a plurality of different frequencies along its length providing for cancellation and other undesirable intermixture of signals which tends to effect the efficiency of the vibrating reed for use as a transmitter. These difficulties may be overcome by providing a proper shield and sound directing structure on the body of the transmitter which is properly located to enhance the particular frequency emitted from the vibrating reed and desired for control purposes.

Therefore, it is another object of this invention to provide a novel means for selecting, directing and enhancing the signal which is desired to be transmitted.

In order to obtain reproducibility of the reed vibration, it is necessary to closely approximate a perfect fixed end for the reed.

It is therefore another object of this invention to provide a novel structure for securing the vibrating reed on a mounting means such that the mount to which it is attached has a much larger moment of inertia than the reed.

In carrying out this invention in one illustrative form thereof, a vibrating reed transmitter is provided with a mounting structure for tightly clamping a vibrating reed in the mount. The mounting structure is rigidly attached to a folded chassis member. Atttached to the mounting structure is an impactor. Also attached to the mounting structure and surrounding the reed is a shield or shroud with a sound radiating hole therein and a coupling horn thereon. The vibrating reed extends on its free end through a hole in a formed side of the chassis which forms a ramp for a trigger suitably bearing on the ramp below the reed. A rocker arm actuated by a lever arm cams a trigger lever which forces the trigger up the ramp to release the vibrating reed producing a smooth trigger action.

Figure 2:
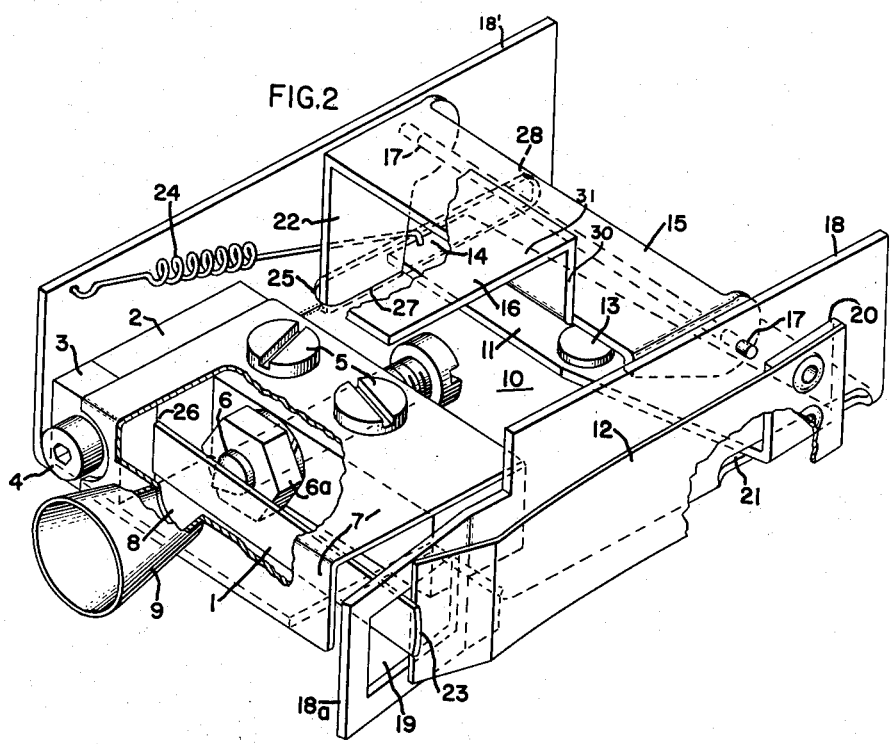

The invention, both as to its organization and method of operation together with further objects and advantages thereof, may best be understood by reference to the following description taken in connection with the accompanying drawings, in which:

FIGURE 1 is a schematic showing of the vibrating reed transmitter to illustrate its operation and FIGURE 2 is a perspective view with parts broken away for clearly showing the structure for the vibrating reed transmitter embodied in this invention.

Referring now to FIGURE 1 for an explanation of the operation of the transmitter embodied in this invention, a vibrating reed 1' is clamped between a mount 2' and cap 3' which are immobile. If the reed 1' were displaced from its equilibrium position and released it would vibrate at its fundamental frequency which would be determined by the physical characteristics of the reed such as material of the reed, length, width or if a circular reed the radius, etc. The vibration of the reed is illustrated by the excursions to the points A—A' assuming that the travel of the reed is unobstructed.

If a rigid member 6' referred to as an impactor is placed such that the reed will strike it during some portion of the oscillation, the impactor 6' will distort the shape of the reed from its maximum position of A to that of B. Such a distortion of displacement in shape as shown from the excursion A to B of the reed contains or causes overtones of the fundamental frequency of vibration of the reed. Accordingly, the impactor 6' produces the generation of overtones in the reed during some portion of each cycle of the vibration of the reed. The impactor also increases first mode or fundamental frequency of the reed. This increase is due to the effective shortening of the free length of the reed during contact with the impactor 6'. The positioning of the impactor 6' along the axis of the reed 1' has a marked effect upon the frequencies generated by the reed. Large displacements toward the free end of the reed cause increasingly more violent higher mode excitation and large decreases in duration. Small changes in the impactor location near the fixed end changes the predominant higher mode frequencies. For purposes of explanation it is assumed that the high mode deflection curve of the impactor reed is the same as that for a freely vibrating reed. For generating a higher mode frequency impact would take place at the nodal point of the mode which is desired to be generated. Free reed theory predicts the location of the nodes of any mode as a percentage of the total free length of the reed. A reed and mount constructed with the reed proportioned for the desired sonic frequency and the impactor located at the first node of the desired high mode deflection shape yields an output only slightly different from that desired. The difference is caused by the impactor raising the first mode frequency of the reed. Slight corrections in reed length or other dimensions and maintaining the percentage of impactor location will yield the desired modulated ultrasonic signal. Absence of the impactor would prevent the generation of an ultrasonic modulated signal which is desired for remote control purposes.

A transmitter constructed in accordance with this invention is shown in FIGURE 2. The resilient reed 1 is clamped to the mount 2 by a cap 3 which is made of soft metal alloy utilizing a machine screw 4. The cap 3 and the mount 2 have machined, formed or cast therein shoulders 26 which in combination with the machine screw 4 aligns the reed in a transverse direction in the clamp structure. This clamping structure approximates a perfect fixed end which is necessary to obtain a reproducible transmitter. The cap 3 of soft metal alloy such as duraluminum provides a deformable gasket material and the machine screw 4, a compression fastener, to tightly clamp the reed at one end thereof. As an alternative, the reed may be welded, brazed or soldered to the mounting members. A further requirement for the mount to which the reed is attached is that it have a moment of inertia larger than that of the reed to insure that all vibration is done by the reed.

An adjustable impactor 6 is attached to the mount 2 and is provided with a locking nut 6a once it is properly positioned in the mount 2. The entire vibrating reed structure is rigidly attached to a folded sheet metal chassis 10 by mounting screws (not shown) on the underside of the chassis which unite the mount 2 and the chassis 10. A side 18 of the chassis 10 adjacent to the free end of the reed 1 is provided with a hole 19 in which the reed 1 is free to vibrate. The side 18 is formed to have a ramp 18a thereon such that the reed 1 protrudes slightly through the side when it is at rest and the reed is in the same plane as the outer surface of the side 18 when the reed is deflected the desired amount.

A trigger mechanism is attached to the chassis 10 for exciting the reed into vibration. It includes a trigger lever 11 which is free to rock about an attaching rivet 13 secured to the chassis 10. The trigger lever 11 has a folded end 20 which passes through a slot 21 in the chassis. The folded end has riveted on its vertical surface thereof a trigger arm 12. The trigger arm 12 is at all times in contact with the ramp 18a of the side 18. The other end 14 of the trigger lever 11 rests in a slot 27 in which its rearward motion is stopped by the slot end 28 of slot 27. In the formed sides 18, 18' of the chassis 10 are symmetrically located holes which form bearings for a pivot pin 17. A rocker 15 is mounted to the chassis 10 by the pivot pin 17. A lever arm 16 is integral with the rocker 15. The lever arm 16 includes a vertical segment 30 and a horizontal segment 31. A decorative push button could be attached to segment 31 for applying a vertical manual actuating force thereto and for appearance value if so desired. Folded into the rocker 15 is a trigger cam 22 which actuates the trigger lever 11 when the rocker 15 is forced to rotate by a downward vertical finger pressure exerted on segment 31. The trigger cam 22 extends through the slot 27 and its forward motion is stopped by the slot end 25 of slot 27. A biasing helical spring 24 is attached to the chassis 10 and the end 14 of the trigger lever 11 thereby keeping the end 14 of the lever 11 in a forward position against the trigger cam 22 which is against the slot end 25, and consequently keeping the folded end 20 and the trigger arm 12 in a rearward or unactuated position.

The free end 23 of the reed 1 is slightly curved so that the trigger arm 12 overrides and releases the reed smoothly and from the center. A similar smooth trigger action might be obtained by having the end of the trigger slightly curved and the free end 23 of the reed straight. In either case a one point release is obtained.

During the portion of the first mode vibration cycle that the reed makes contact with the impactor 6, it produces higher mode sound energy. This energy is generated along the reed length at discrete anti-nodal points which causes the sound to form many addition and cancellation lobes. To overcome this nondirectionality, a shell or shroud 7 is added to the reed structure. The shroud 7 surrounds the reed with a radiating hole 8 and a coupling horn 9 positioned thereon. The shroud 7 and the horn assembly is removably attached to the mount 2 by fasteners 5. The hole 8, approximately one-half the desired ultrasonic wave length in diameter, is placed at a point of high ultrasonic energy, in front of the shroud 7. Such a point has been found to exist approximately one-half wave length from the surface of the reed and in line with the impactor 6. The sound energy radiated from such a hole is reduced in intensity from the maximum lobe of the unshrouded reed, but it is in one smooth lobe. Adding a conical horn or more refined acoustical impedance matching device to this hole converges the sound energy into a narrower lobe of higher intensity. This convergence to a single lobe is required for the proper operation of a modulated sonic information system. Multiple lobes allow multiple transmission paths of different length and consequent sonic cancellation at the receiver of the transducer which cannot be tolerated.

In operation, when the lever arm 16 is depressed by a vertical force exerted on segment 31, the rocker 15 rotates about the pivot pin 17. The trigger cam 22 leaves the end 25 of the slot 27 and forces the end 14 of the trigger lever 11 to the rear. The trigger lever rotates about its mounting rivet 13, and the folded end 20 moves forward. This motion causes the trigger arm 12 to slide down the chassis side 18a contacting the end 23 of reed 1 and forcing it forward. When the reed has reached the desired deflection, the ramp 18a of side 18 cams the trigger 12 away and releases the reed 1 for vibration. The triggering of the reed 1 suddenly changes the force balance in the mechanism causing the trigger lever 11 to continue rotating until end 14 is stopped by the slot end 28. The released reed 1 continues vibrating in its first mode striking the impactor 6 each cycle. This causes the generation of ultrasonic energy which is contained from scattering by the shroud 7 and allowed to escape by the hole 8 and horn 9 to the surrounding air, ultimately reaching a remote control receiver (not shown). When the operator senses that an adequate signal has been transmitted, he releases pressure on the push-button 16 allowing the return spring 24 to rotate the trigger lever 11 so that the trigger 12 passes back across the opening 19 interfering with the reed end 23 and accordingly damping out its vibration. The return spring continues to rotate the trigger lever until its end 14 forces the trigger cam 22 against the chassis slot end 25 thereby holding all moving parts in a fixed cocked position and ready for a subsequent actuation.

As an alternative to the construction shown in FIGURE 3, a die cast reed assembly could be provided. In such a case the horn 9, the portion of the shroud 7 mounting the horn and the cap 3 could be die cast as one piece. The remaining portion of the shroud, mount and impactor attaching the hole could constitute the second piece. Also, the entire shroud, horn and cap could be made one piece and the reed integral with them by insert molding techniques. The lock-nut 6a for setting the impactor 6 might be any other vibration resisting device for retaining machine screws. Further, since it is necessary for proper operation to have the mount 2 rigidly attached to the chassis 10, these parts might be folded, molded or cast as one piece.

Since other modifications and changes varied to fit the particular operating requirements and environments will be apparent to those skilled in the art, this invention is not considered limited to the examples chosen for purposes of disclosure and covers all changes and modifications which do not constitute a departure from the true spirit and scope of this invention.

What I claim as new and desire to secure by Letters Patent of the United States is:

1. A vibrating reed transmitter for generating an ultrasonic carrier wave having a sonic amplitude modulation component, comprising: a chassis for the transmitter having a base and a folded over side portion thereof; said side portion having an outer surface; said side portion including a ramp segment extending away from the base portion and having an aperture located in said ramp segment; a resilient reed; mounting means secured to said base portion for supporting and tightly clamping said reed at one end of its length and leaving an unclamped portion of the length of said reed free to oscillate when said reed is mechanically excited; said mounting means positioned on said base portion for providing extension of a segment of said unclamped portion of the length of said reed through said aperture; said mounting means and reed comprised of materials proportioned and dimensioned for establishing a natural frequency of mechanical oscillation for said reed within a range of relatively low sonic frequencies when said reed is excited into mechanical oscillations; an unyielding impactor positioned in the vicinity of the unclamped portion of the length of said reed for being struck by said reed when said reed is mechanically excited; said impactor positioned at a point along the unclamped portion of the length of said reed for causing said reed to oscillate at a desired ultrasonic overtone frequency of said natural frequency of oscillation when said impactor is struck by said reed; and excitation means for deflecting said reed at the unclamped end thereof in response to a manual operative force applied thereto, said excitation means comprising a trigger arm positioned at said outer surface of said side portion and adapted, when actuated, to make contact with and override said segment of said reed extending through said aperture, a trigger lever pivotally mounted on said base portion and coupled to said trigger arm, spring bias means coupled to said trigger lever for biasing said trigger lever in an unactuated position, a pivotally mounted rocker having a trigger cam segment, said cam segment arranged for causing rotation of said trigger lever when said rocker is pivotally rotated, and lever means for coupling an operative force applied thereto to said rocker for causing pivotal rotation of said rocker.

2. A vibrating reed transmitter for generating an ultrasonic carrier wave having a sonic amplitude modulation component, comprising: a chassis for the transmitter, said chassis having a base and a side portion thereof; said side portion including a ramp segment extending away from the base portion and having an aperture located in said ramp segment; a resilient reed; mounting means secured to said base portion for supporting and tightly clamping said reed at one end of its length and leaving an unclamped portion of the length of said reed free to oscillate when said reed is mechanically excited; said mounting means positioned on said base portion for providing extension of a segment of said unclamped portion of the length of said reed through said aperture; said mounting means and reed comprised of materials proportioned and dimensioned for establishing a natural frequency of mechanical oscillation for said reed within a range of relatively low sonic frequencies when said reed is excited into mechanical oscillations; an unyielding impactor positioned in the vicinity of the unclamped portion of the length of said reed for being struck by said reed when said reed is mechanically excited; said impactor positioned at a point along the unclamped portion of the length of said reed for causing said reed to oscillate at a desired ultrasonic overtone frequency of said natural frequency of oscillation when said impactor is struck by said reed; and excitation means for deflecting said reed at the unclamped end thereof for causing mechanical oscillation of said reed; said excitation means comprising a trigger arm disposed at an outer surface of said side portion of said chassis and having an unactuated position thereon, and actuating means adapted for causing said trigger arm to traverse said ramp segment of said side portion from the unactuated position, to make contact with and override the end of said reed extending through the aperture and to return said trigger arm to the unactuated position.

3. The transmitter of claim 2 including selective means for deriving and radiating a desired overtone frequency from one point along the length of said reed and for substantially suppressing the radiation of said desired overtone frequency which is generated at other points along the length of said reed and for substantially suppressing the radiation of overtones of other undesired frequencies.

4. The transmitter of claim 3 wherein said selective means comprises a shroud positioned about the length of said reed and having a radiating aperture spaced opposite a point on the length of said reed where acoustical energy of the desired overtone frequency is predominant.

5. The transmitter of claim 4 wherein said radiating aperture in said shroud is circular, said aperture having a diameter equal in length to the length of one half of one wavelength of said desired overtone frequency.

6. The transmitter of claim 4 wherein said radiating aperture is spaced from the reed approximately a distance equal in length to the length of one half of one wavelength of said desired overtone frequency.

7. The transmitter of claim 4 wherein an acoustical horn is mounted at said radiating aperture.

References Cited in the file of this patent

UNITED STATES PATENTS

| | | |
|---|---|---|
| 1,787,196 | Haims | Dec. 30, 1930 |
| 2,458,875 | Pfeiffer | Jan. 11, 1949 |
| 2,514,153 | Dickerson | July 4, 1950 |
| 2,563,877 | Sfreddo | Aug. 14, 1951 |
| 2,582,441 | Kunz | Jan. 15, 1952 |

FOREIGN PATENTS

| | | |
|---|---|---|
| 1,205,837 | France | Aug. 24, 1959 |